United States Patent [19]

Fauth et al.

[11] 4,287,334
[45] Sep. 1, 1981

[54] PROCESS FOR MANUFACTURING VISCOSE

[75] Inventors: Heinrich Fauth, Mainz; Werner Koch, Hochheim-Massenheim, both of Fed. Rep. of Germany

[73] Assignee: Hoechst Aktiengesellschaft, Frankfurt am Main, Fed. Rep. of Germany

[21] Appl. No.: 101,448

[22] Filed: Dec. 10, 1979

[30] Foreign Application Priority Data

Dec. 20, 1978 [DE] Fed. Rep. of Germany ....... 2855061

[51] Int. Cl.$^3$ ............................................. C08B 9/04
[52] U.S. Cl. ........................................ 536/60; 106/165
[58] Field of Search ........................... 536/60, 61, 101; 106/164, 165

[56] References Cited

U.S. PATENT DOCUMENTS

| | | | |
|---|---|---|---|
| 1,955,092 | 4/1934 | Richter | 536/101 |
| 2,143,863 | 1/1939 | Collings et al. | 536/101 |
| 2,735,846 | 2/1956 | Richter | 536/101 |
| 2,985,647 | 5/1961 | Von Kohorn | 536/60 |
| 3,600,379 | 8/1971 | Sihtola et al. | 536/60 |
| 3,728,330 | 4/1973 | Sihtola et al. | 106/165 |
| 4,136,255 | 1/1979 | Franks | 106/165 |

FOREIGN PATENT DOCUMENTS

| | | |
|---|---|---|
| 1030323 | 5/1958 | Fed. Rep. of Germany . |
| 1924804 | 12/1969 | Fed. Rep. of Germany . |
| 52-40589 | 3/1977 | Japan . |
| 99494 | 6/1923 | Switzerland . |

*Primary Examiner*—Ronald W. Griffin
*Attorney, Agent, or Firm*—Schwartz, Jeffery, Schwaab, Mack, Blumenthal & Koch

[57] ABSTRACT

Process for manufacturing viscose solutions having good filterability and producing low amounts of sulfide gases during subsequent spinning; said process comprising treating cellulose with a first alkali metal hydroxide solution in a first alkalization step, freeing the alkalized cellulose from at least part of the excess hydroxide solution without pressing-off, and treating the cellulose with a second alkali metal hydroxide solution in a second alkalization step while maintaining the temperature of the reaction mixture at not more than 18° C.

9 Claims, No Drawings

PROCESS FOR MANUFACTURING VISCOSE

This invention relates to a process for manufacturing viscose, wherein pulp is chemically converted to alkali cellulose, which in turn is sulfided with carbon disulfide and the resulting cellulose xanthate is dissolved in an aqueous alkali metal hydroxide solution.

BACKGROUND OF THE INVENTION

It is known to produce viscose by treating sulfite pulp, produced from softwood, in the form of sheets or as a slurry with aqueous sodium hydroxide solution, mechanically pressing the resulting alkali cellulose to remove excess hydroxide solution, mechanically disintegrating the alkali cellulose and aging the disintegrated cellulose, during which the average degree of polymerization of the cellulose is degraded to a desired value—for example an average degree of polymerization of 300. The alkali cellulose with degraded molecular structure is then sulfided by reacting it with carbon disulfide. The cellulose xanthate formed during the chemical sulfiding reaction is then dissolved in sodium hydroxide solution, and the solution is subjected, if necessary, to another standing period for further aging, during which time the solution can be filtered and degassed in a known manner.

The amount of carbon disulfide required to sulfide the alkali cellulose with carbon disulfide to produce cellulose xanthate depends on the qualitative and quantitative structure of the initial cellulose which varies according to its source. The amount of carbon disulfide required also varies with the molecular weight distribution of the alkali cellulose to be sulfided and with the desired properties of the viscose produced in the process, depending on the intended use of the product. If the viscose is to be used in the manufacture of films, a smaller feed quantity of carbon disulfide is required for sulfiding alkali cellulose than is needed in the manufacture of viscose destined for the production of staple rayon. For high-strength fibers, the amount of carbon disulfide required for sulfiding may be twice as high as the amount needed in the manufacture of viscose to be used for producing staple rayon.

The aqueous NaOH solution containing dissolved cellulose xanthate generally contains from 4 to 10% by weight cellulose and from 4 to 7% by weight sodium hydroxide, relative to the total weight of the solution.

In sulfiding sodium cellulose with carbon disulfide, up to about 65 to 70% of the quantity of carbon disulfide supplied for this purpose is consumed in the desired reaction for the formation of cellulose xanthate, while about 25 to 30% of the total amount of carbon disulfide supplied is consumed in the formation of undesired by-products and about 3 to 5% by weight of the total quantity of carbon disulfide supplied during sulfiding remains chemically unconverted.

In the sulfiding reaction of alkali cellulose with carbon disulfide, the formation of by-products with a consumption of carbon disulfide is undesirable not only because of the uneconomical consumption of carbon disulfide and alkali metal hydroxide solution, but also because, during the further processing of the viscose solution, these by-products decompose and form noxious gases which interfere considerably with the course of production. For example, the troublesome hydrogen sulfide liberated during the process of spinning a viscose solution, is formed as a result of chemical decomposition of sulfur-containing by-products in the viscose solution.

For this reason, attempts have been made to control the visose-manufacturing process in such a way that the total quantity of carbon disulfide supplied for sulfiding a given quantity of alkali cellulose is utilized in an optimum manner to produce cellulose xanthate, and the formation of undesired by-products is largely suppressed.

Thus, a viscose-manufacturing process is known which serves this aim and wherein the alkali cellulose conventionally prepared in the first process step is, after mechanically pressing off the excess alkali metal hydroxide solution, shredding the alkali cellulose and ripening the shredded material, subjected to at least one further alkalization in which the NaOH concentration of the aqueous hydroxide solution, reacted with the alkali cellulose, is less than 15% by weight.

As a result of the second alkalization of the alkali cellulose which has been pressed off and then pre-aged, the amount of carbon disulfide required to sulfide the cellulose in order to prepare a viscose solution of defined properties is markedly lower than the amount needed to prepare corresponding viscose solutions when the process comprises only one alkalization step with a sodium hydroxide solution of relatively high concentration.

When the quantity of carbon disulfide supplied for sulfiding alkali cellulose is utilized to the optimum, however, this known viscose-manufacturing process comprises the following sequence of the process steps:
(a) first alkalization of the cellulose
(b) mechanically pressing-off excess hydroxide solution from the alkali cellulose
(c) shredding the alkali cellulose
(d) ripening the alkali cellulose
(e) alkalizing the ripened product of step (d)
(f) mechanically pressing-off excess hydroxide solution from the alkali cellulose
(g) shredding the alkali cellulose
(h) sulfiding the alkali cellulose
(i) dissolving the cellulose xanthate and
(j) further aging the viscose It will be appreciated that such a process has the disadvantage of being very involved and uneconomical.

SUMMARY OF THE INVENTION

It is an object of the present invention to provide a process for manufacturing viscose which is less complex than prior processes.

Another object of the present invention is to provide a process for manufacturing viscose which uses carbon disulfide efficiently.

A further object of the present invention is to provide a process for manufacturing viscose in which the formation of sulfurous by-products is minimized.

Still another object of the present invention is to provide a process for manufacturing viscose solutions having a viscosity suitable for spinning.

It is also an object of the present invention to provide a process for manufacturing viscose having desired properties required for further processing.

The objects of the invention are achieved by providing a viscose-manufacturing process comprising treating cellulose with an alkali metal hydroxide solution in a first alkalization step, freeing the alkalized cellulose from at least part of the excess hydroxide solution without pressing the cellulose, and treating the cellulose with a second alkali metal hydroxide solution in a second alkalization step while maintaining the temperature of the reaction mixture at not more than 18° C.

DETAILED DESCRIPTION OF THE PREFERRED EMBODIMENTS

The following text describes a preferred example of how the process of the invention may be carried out:

Initially, sodium hydroxide solution, for example a solution having a NaOH concentration in the range from 16 to 20% by weight, relative to its total weight, is caused to act in a manner known per se on pulp—for example in the form of sheets—for a period in the range from 20 to 50 minutes at a temperature of 25° C. (first alkalization step). The reaction mixture contains from 4 to 7% by weight cellulose, relative to the total weight.

The alkali cellulose is then freed at least partially from excess sodium hydroxide solution without subjecting it to the action of a pressing force. For example, this may be done by causing all or part of the excess sodium hydroxide solution to run off the alkali cellulose. An alkali metal hydroxide solution having a concentration in the range from 11 to 15% by weight is then again caused to act on the alkali cellulose for a period in the range from 20 to 50 minutes, preferably 25 to 35 minutes (second alkalization step). The action of the sodium hydroxide solution on the alkali cellulose during the second alkalization step takes place at a temperature which during the entire reaction is not more than 18° C. Preferably, the sodium hydroxide solution has a temperature of not more than 15° C. at the beginning of the reaction period, and most preferably, a temperature in the range of 5° to 10° C. If necessary, the temperature of the reaction material may be adjusted during the second alkalization step to prevent it from rising above 18° C. For this purpose, the mixture may be cooled appropriately, or the initial temperature of the alkali metal hydroxide solution may be selected sufficiently low that even without cooling the temperature does not exceed 18° C. during the entire treatment period. In the second alkalization, the reaction mixture contains from 4 to 7%, preferably 4.5 to 5.5%, by weight cellulose relative to the total weight.

Excess alkali metal hydroxide solution is then pressed off the mixture. The resulting alkali cellulose comprises from 30 to 34% by weight, preferably 32% by weight, cellulose and from 11 to 15% by weight NaOH in each case relative to the total weight of the alkali cellulose. Pressing-off is effected under a pressure of, for example, 140 bars, the pressing factor is, for example, 2.9 and the duration of pressing is, for example, 15 to 30 minutes.

Due to the use of an alkali metal hydroxide solution having the indicated criteria in the second alkalization, it is not necessary to remove excess alkali metal hydroxide solution by pressing-off after the first alkalization.

The pressed-off alkali cellulose is then comminuted in a known manner, for example by using a mill or shredder.

The shredded alkali cellulose is then aged or ripened for a period, for example, in the range from 20 to 25, preferably 23 to 24, hours. The meaning of the term "aging" is explained in the book "Chemiefasern nach dem Viskoseverfahren [Chemical Fibers Obtained by the Viscose Process]," 3rd Edition, Volume I, 1967, Springer-Verlag, Berlin-Heidelberg-New York, on page 38.

The ripening of the alkali cellulose which occurs during aging leads, upon depolymerization of the cellulose molecules, to an average degree of polymerization of the cellulose of, for example, from 500 to 600.

Carbon disulfide is then caused to act on the aged alkali cellulose for the purpose of sulfiding the latter. The action of carbon disulfide takes place, for example, at a temperature of from 30° to 35° C. for a period of from 60 to 120 minutes, typically from 80 to 95 minutes.

Relative to the total weight of the cellulose to be sulfided, an amount of carbon disulfide in the range from 22 to 28%, preferably 24 to 26%, by weight is used.

The product prepared in this way is dissolved in aqueous sodium hydroxide solution, for example a solution having a concentration in the range from 3.5 to 4.0% by weight of NaOH, relative to its total weight, to give a cellulose concentration in the range from 7.0 to 7.2% by weight, relative to the total weight of the solution.

The solution prepared as indicated above is aged for from 8 to 10 hours at a temperature of from 30° to 34° C., during which period the desired spinning viscosity is attained by further ripening of the viscose. The desired viscosity required for further processing by the spinning process to give films, tubing or fibers will vary according to the intended purpose of the viscous solution. During the aging period, the solution can be filtered and degassed in the known manner. The prepared solution is called viscose.

In the following text, two special alternate embodiments of the process of the invention are described.

1. Double alkalization without intermediate pressing-off

The pulp to be processed, in the form of linters, is first converted to alkali cellulose in the known manner with sodium hydroxide solution by so-called steeping alkalization. The treatment time with the alkali metal hydroxide solution in the steeping alkalization can be reduced to half the customary duration, for example to a period of from 20 to 40 minutes. The sodium hydroxide solution has a concentration of from 16 to 20% by weight of NaOH, relative to the total weight of the solution. The reaction mixture, including sodium hydroxide solution and cellulose, contains from 4 to 7% by weight cellulose, relative to the total weight.

After the action of the hydroxide solution has taken place, excess hydroxide solution is decanted from the alkali cellulose into a separate vessel. The used hydroxide solution can be reconcentrated and then reused.

Sodium hydroxide solution having a concentration of from 13 to 15% by weight is then added to the vessel containing alkali cellulose in such a quantity that the mixture comprises 4 to 7% by weight of cellulose, relative to the total weight. It is essential to the invention that the temperature of the hydroxide solution during the action is not more than 15° C., preferably 5° to 10° C., and does not exceed 18° C. during the entire period of action. The period of action of the hydroxide solution in the second alkalization step ranges from 20 to 40 minutes. If the initial hydroxide solution has a temperature of, for example 5° to 10° C., the temperature of the hydroxide solution does not rise above 18° C. during the period of action, even without further cooling. A homogeneous equalization of the concentration in and between the alkalized pulp sheets is obtained by circulating the hydroxide solution during the period of action (steeping period).

The twice-alkalized pulp in the form of linters is then pressed in the known manner to remove excess hydroxide solution. A conventional steeping press may be used. The pressing period is, for example, 15 minutes, the pressure of the press 85 bars and the pressing factor 2.9.

The hydroxide solution removed from the alkalized product after the second alkalization step has a concentration of from 13.5 to 15.8% by weight of NaOH, relative to the weight of the hydroxide solution. This concentration is higher than that of the initial hydroxide solution used in the second alkalization.

The alkali cellulose, prepared by double alkalization of linters, comprises from 30 to 34% by weight cellulose and from 13 to 15% by weight sodium hydroxide, in each case relative to the total weight of the sodium cellulose.

The condition of the alkali cellulose produced by the present process in which the alkali content is lower than in the known, conventional viscose-manufacturing processes with a single alkalization, makes possible a 25 to 30% reduction in the weight of carbon disulfide supplied to the following sulfiding step, relative to the customary amount of carbon disulfide used after a single alkalization, and/or a 10 to 20% by weight reduction in the alkali content of the viscose produced in the process, relative to the customary alkali content after a single alkalization, without adversely affecting the filtration properties of the viscose which can be manufactured. The filter value $k_f$ is characteristic of the filtration properties of the viscose. This value is determined as follows:

The determination of the filter value $k_f$ is carried out with the aid of a filtration device, such as is described in Zellcheming-Merkblatt ("Zellcheming-Specification") III/4/66. The filter material used is a combination of nettle cloth/kalmuk/nettle cloth. The filter area is 28 cm² and the upstream filtration pressure is 2 bars. After charging the filter tube with about 1 liter of viscose to be tested and applying the upstream pressure, the time t, during which 120 ml of viscose flow into a 500 ml measuring cylinder, is measured with a stopwatch. After a total filtration time of 4×t, the quantity m of filtrate which in the meantime has collected in the measuring cylinder is read off on the scale.

The filtration value $k_f$ is then calculated as follows:

$$k_f = (m/4.8)\%$$

Low $k_f$ values, for example $k_f = 50\%$, denote poor filterability, while high $k_f$ values, for example $k_f = 75\%$, denote good filterability of the viscose solution.

The process variant of double alkalization without intermediate pressing-off can be carried out particularly advantageously in a steeping press alkalization process.

2. Dilution Alkalization

This process variant differs from the previously described one in that, after the first alkalization, the alkali metal hydroxide solution is drained off only partially or not at all, avoiding the action of the pressure of a press, and the hydroxide solution concentration desired for the second alkalization is adjusted by addition of water.

In this embodiment, the proportion of hydroxide solution which is to be removed and the quantity of water which is to be added are calculated from the concentration of hydroxide solution desired for the second alkalization step.

The added water has a temperature of not more than 15° C., and preferably a temperature in the range from 5° to 10° C., so that a dilute sodium hydroxide solution having a temperature of not more than 15° C., preferably a temperature of 5° to 10° C., is formed after the added quantity of water has been mixed in the reaction vessel with the remaining proportion of hydroxide solution. Ice water having a temperature of about 0° C. can be used with particular advantage to dilute the remaining proportion of hydroxide solution in the reaction vessel. The second alkalization proceeds during its entire duration at a temperature of not more than 18° C.

The dilute sodium hydroxide solution, used in the second alkalization step, has a concentration of from 13 to 15% by weight of NaOH, relative to its total weight. After the addition of the hydroxide solution, the mixture contains from 4 to 7% by weight cellulose, relative to the total weight.

This process embodiment can also be modified, however, in such a way that the alkali metal hydroxide solution remaining in the reaction vessel from the first alkalization step is diluted, without partial draining of hydroxide solution, by only adding the quantity of water needed to produce the desired final hydroxide solution concentration in the second alkalization step. In this process modification, however, the total volume in circulation is greatly increased, which involves some disadvantages.

In an advantageous alternative embodiment of the process, a sodium hydroxide solution having a temperature of not more than 18° C. is used in the first alkalization step, with the result that it is easier to regulate the essential temperature of the hydroxide solution in the second alkalization step.

After the second alkalization has taken place, the mixture is further treated in the customary manner: excess hydroxide solution is pressed off the alkali cellulose, the pressed alkali cellulose is shredded, the shredded alkali cellulose is allowed to stand in order to ripen it, and the alkali cellulose is subsequently sulfided with carbon disulfide, under the same conditions used in the first process variant.

The second process variant is particularly useful when the viscose manufacture starts from pulp slurry. In this case, for example, the following continuous procedure results:

The first alkalization of the cellulose takes place with alkali metal hydroxide solution of customary concentration at a slurry consistency which is adjusted in such a way that, after diluting the hydroxide solution to the concentration desired for the second alkalization, a slurry consistency of 5% by weight results. If, for example, these hydroxide solution concentrations are 19% by weight (first alkalization) and 13% by weight (second alkalization), the stock consistency in the first alkalization must be set to 7.5% by weight. The dilution of the slurry with cold water takes place on the way between the slurry tank and the intermediate vessel serving as a buffer, advantageously in a suitable known homogenizer, by continuously metering in the predetermined quantity of water. The second alkalization takes place in the intermediate vessel with moderate agitation and an overall alkalization period ranging from 20 to 40 minutes, preferably 30 minutes, at a temperature of not more than 18° C., desirably at a temperature in the range of from 5° to 10° C. In this case also, it is particularly advantageous if an alkali metal hydroxide solution, the temperature of which is no higher than 18° C., is used in the first alkalization step.

Any type of pulp can be used in the process of the invention. Linters can also be used. The NaOH concentration of the sodium hydroxide solution used in the second alkalization step depends on the type of the pulp and must be selected accordingly. If wood pulp is used, it is advantageous to use a sodium hydroxide solution having a concentration from 11 to 13% by weight of NaOH, relative to the total weight of the hydroxide solution. When using linters, the sodium hydroxide solution should have a concentration in the range from 13 to 15% by weight of NaOH, relative to its total weight.

The process of the invention makes it possible to reduce the amount of carbon disulfide required to sulfide the alkali cellulose. This has the result that, for example, the quantity of carbon disulfide released in the waste gases when spinning fibers or films from the viscose solution is reduced by about 19% and the quantity of hydrogen sulfide is reduced by about 50%. This reduction in the sulfide content of the exhaust gas is of very special importance from the point of view of protecting the environment.

A further advantage of less gas being evolved when spinning a viscose solution produced by the process of the invention consists in a lengthening of the so-called cutting time when tubing is manufactured by spinning viscose into appropriate precipitating baths. To remove gas and spent acid from the interior of the tubing, the tubing must be slit open at certain intervals. Due to the smaller quantity of gases evolved when spinning viscose produced by the process of the invention, it is possible to lengthen the time interval between incisions into the tubing, which become necessary, by a factor of 2 to 3. This has an advantageous effect on the amount of waste product obtained and on the further processing of the product.

The process of the invention is illustrated by the following examples:

EXAMPLE 1

Beech pulp in the form of sheets, having the characteristic data:

$R_{18} = 93.5\%$
$DP = 675$
Ash $= 0.04\%$
Extract $= 0.2\%$ is treated by the known steeping alkalization procedure in a reaction vessel with a sodium hydroxide solution having a concentration of 20% by weight at a temperature of 25° C. for a period of 30 minutes. The reaction mixture comprises a pulp fraction of 5% by weight, relative to the total weight.

Subsequently, the alkali cellulose is freed of excess sodium hydroxide solution by draining the hydroxide solution from the steeping press. The alkali cellulose remaining in the steeping press which has been freed, without pressing, of excess sodium hydroxide solution from the first alkalization step, is then treated for a period of 30 minutes with a sodium hydroxide solution having a concentration corresponding to 12.8% by weight of NaOH. The sodium hydroxide solution used in the second alkalization step has an initial temperature of 15° C. In the course of the 30 minute treatment period, the temperature rises to 17° C.

The twice alkalized cellulose is then pressed to remove excess hydroxide solution and is comminuted with a conventional shredder. The shredded alkali cellulose is aged for 48 hours. At the end of the aging period, the cellulose has an average degree of polymerization of about 330. The alkali cellulose comprises 34.5% by weight cellulose and 12.9% by weight alkali, relative to the total weight of the alkali cellulose.

The alkali cellulose is then sulfided with carbon disulfide. For this purpose, the alkali cellulose is charged with 22% by weight of carbon disulfide, relative to the cellulose content of the alkali cellulose. The reaction product obtained from carbon disulfide and alkali cellulose is then dissolved in an aqueous sodium hydroxide solution having a concentration of about 3% by weight. The resulting viscose solution has a cellulose content of 9.8% by weight and an alkali content of 5.6% by weight, relative to the total weight of the solution. The viscose has a $k_f$ value of 77%. With a theoretically calculable filter value $k_f$ of 100%, a filter value of 70% or higher denotes good filterability of the solution.

EXAMPLE 2

Highly refined "hardwood" sulfate pulp is alkalized in a reaction vessel as described in Example 1, in a first alkalization step with a sodium hydroxide solution of a concentration corresponding to 19.5% by weight of NaOH for a period of 30 minutes at a temperature of 25° C. The reaction mixture contains about 5% by weight cellulose, relative to the total weight.

Without pressing-off, the alkalized cellulose is freed from excess sodium hydroxide solution by draining the solution from the reaction vessel.

The alkalized pulp from the first alkalization step is subjected to a second alkalization by treating it with a sodium hydroxide solution having a NaOH concentration corresponding to 13% by weight, relative to the total weight of the hydroxide solution for a period of 30 minutes. The sodium hydroxide solution has an initial temperature of 10° C. The reaction mixture comprises about 5% cellulose by weight, relative to the total weight. During the alkalization period, the temperature of the sodium hydroxide solution rises to about 12° to 13° C. The further treatment of the reaction material is carried out as described in Example 1. The pressed-off alkali cellulose comprises 35.2% by weight cellulose and 14.3% by weight alkali, relative to the total weight of the alkali cellulose. Sulfiding of the twice alkalized cellulose is effected with a quantity of carbon disulfide of 25% by weight, relative to the weight of the cellulose in the alkali cellulose. The reaction product of the alkali cellulose and carbon disulfide is dissolved in an aqueous sodium hydroxide solution having a concentration of about 3%. The resulting viscose solution has a cellulose content of 6.9% by weight and an alkali content of 5.6% by weight, in each case relative to the total weight of the solution. The filter value of the viscose solution is 73%.

EXAMPLE 3

Cotton linters in the form of sheets are alkalized for a period of 30 minutes in a sodium hydroxide solution having a NaOH concentration of 19.4% by weight and a temperature of 28° C. in an appropriate reaction vessel. The mixture has a cellulose content of 5% by weight, relative to the total weight. The alkalized cellulose is then freed of excess sodium hydroxide solution without pressing-off by draining the solution from the reaction vessel.

The alkali cellulose produced in the first alkalization step is then subjected to a second alkalization by treating it for a period of 30 minutes with a sodium hydroxide solution having a NaOH concentration of 14.3% by weight relative to the total weight of the hydroxide solution. The sodium hydroxide solution utilized has an initial temperature of 15° C. During the course of the alkalization, the temperature of the sodium hydroxide solution in the mixture rises to 18° C. The reaction mixture has a cellulose content of 5%, relative to the total weight.

Further treatment of the alkali cellulose, which after pressing-off contains 35.4% by weight cellulose and 13.8% by weight NaOH, proceeds as described in Example 1. Sulfiding of the alkali cellulose is effected by treating it with a quantity of 25% by weight of carbon disulfide, relative to the cellulose content of the alkali cellulose. The resulting viscose solution contains 7.1% by weight cellulose and 5.7% by weight alkali, relative to the total weight of the solution. The filter value of the viscose solution is 71%.

When spinning this viscose, the waste gases from the acid spinning vat contain only 47 ppm hydrogen sulfide and 77 ppm carbon disulfide, as compared with 96 ppm hydrogen sulfide and 107 ppm carbon disulfide evolved when spinning viscose prepared by sulfiding alkali cellulose with 34% by weight carbon disulfide. The cutting interval for tubing manufactured from viscose prepared according to the invention can be increased from 30 minutes to 75 minutes.

EXAMPLE 4

Cotton linters in the form of sheets are alkalized in a reaction vessel for a period of 30 minutes with a sodium hydroxide solution having a temperature of 18° C. and a NaOH concentration of 20.0% by weight, relative to the total weight of hydroxide solution. The mixture has a cellulose content of 5% by weight, relative to the total weight. The alkalized cellulose is then freed, without pressing-off, from one-third by weight of the hydroxide solution by permitting this quantity to drain from the reaction vessel.

The one-third by weight of hydroxide solution, removed from the reaction vessel, is replaced by adding a corresponding quantity of water having a temperature of about 10° C. After the addition of water, the hydroxide solution has a temperature of 18° C. The appropriate amount of water may advantageously be introduced into the circulation of the hydroxide solution.

The alkali concentration of the hydroxide solution, acting on the alkali cellulose in the course of the second alkalization step, is 13.6% by weight of NaOH, relative to the total weight of the hydroxide solution, and the reaction product then has a cellulose fraction of 5% by weight, relative to the total weight. Throughout the entire duration of the period of action of the hydroxide solution during the second alkalization step, the temperature of the hydroxide solution is prevented from exceeding 18° C. by cooling the reaction vessel. The alkali cellulose is pressed-off, disintegrated and aged as described in Example 1. The resulting alkali cellulose contains 36.1% by weight of cellulose and 14.2% by weight of alkali, in each case relative to the total weight of the alkali cellulose.

Sulfiding of the alkali cellulose with carbon disulfide is effected by using 25% by weight carbon disulfide, relative to the weight of cellulose in the alkali cellulose.

A viscose solution is then prepared as described in Example 1. The solution contains 7.14% by weight cellulose and 5.76% by weight alkali, relative to its total weight. Its filter value is 73%.

EXAMPLE 5

The procedure of Example 4 is repeated except that the added quantity of water has a temperature of 0° C. and the initial temperature of the hydroxide solution in the second alkalization step is 10° C.

The resulting viscose has a cellulose content of 7.2% by weight, an alkali content of 5.9% by weight, in each case relative to the total weight of the viscose, and a filter value of 77%.

EXAMPLE 6

Beech pulp is slurried in a vessel with an alkali metal hydroxide solution having a concentration of 20% by weight and a temperature of about 25° C. to give a mixture with a pulp slurry consistency of 7.5% by weight, relative to the total weight.

After 30 minutes of treatment with the hydroxide solution, sufficient ice water at a temperature of about 0° C. is added to the mixture to produce a slurry consistency of 5% by weight of cellulose, relative to the total weight of the mixture. The slurrying period is 30 minutes. The slurrying temperature is adjusted by cooling the vessel in such a way that the slurry does not exceed a temperature of 18° C.

Excess alkali metal hydroxide solution is then pressed off the alkali cellulose, and the alkali cellulose, which has a cellulose content of 32.8% by weight and an alkali content of 12.5% by weight, is shredded.

The alkali cellulose is then sulfided by treating it with 22% by weight carbon disulfide, relative to cellulose in the alkali cellulose. The reaction product is then dissolved in sodium hydroxide solution having a concentration of about 3%.

The solution is aged for 48 hours, during the course of which the solution is filtered and degassed conventionally. The viscose solution has a cellulose content of 9.5% by weight and an alkali content of 5.5% by weight, in each case relative to its total weight. The filter value is 76%.

When all these experiments were carried out at temperatures of more than 18° C. in the second alkalization, the $k_f$ values were all below 70%. It was found that the higher the temperature in the second alkalization, the further the filter values fell below $k_f=70\%$.

The foregoing examples and preferred embodiments have been set forth only for purposes of exemplification and not by way of limitation. Since modifications of the disclosed embodiments within the spirit and scope of the invention may occur to persons skilled in the art, the scope of the invention is to be limited solely by the scope of the appended claims.

What is claimed is:
1. A process for manufacturing viscose comprising:
   (a) treating cellulose with an excess of alkali metal hydroxide solution in a first alkalization treatment, under conditions such that alkalized cellulose is produced; either
   (b1) freeing the alkalized cellulose produced in step (a) from at least part of the excess hydroxide solution without pressing the alkalized cellulose, comprising the step of draining at least part of the excess alkali metal hydroxide solution from the reaction vessel in which step (a) is effected, and treating the drained alkalized cellulose with a second alkali metal hydroxide solution having a lower alkali metal hydroxide concentration than the alkali metal hydroxide solution used in step (a) in a sec- ond alkalization treatment while maintaining the temperature of the reaction mixture at not more than 18° C.; or (b2) treating the alkalized cellulose produced in step (a) with an alkali metal hydroxide solution obtained by diluting the alkali metal hydroxide solution used in step (a) in a second alkalization treatment while keeping the temperature of the reaction mixture at not more than 18° C.;

(c) pressing the twice-alkalized cellulose from step (b1) or (b2) to remove excess hydroxide solution;

(d) shredding the pressed alkali cellulose from step (c);

(e) aging the disintegrated material from step (d) for a period of time to produce a product having a desired average degree of polymerization;

(f) sulfiding the shredded and aged alkali cellulose; and (g) dissolving the sulfided product to produce a viscose solution.

2. A process according to claim 1, wherein the initial temperature of the alkali metal hydroxide solution used in the second alkalization treatment is not more than 15° C.

3. A process according to claim 2, wherein the initial temperature of the alkali metal hydroxide solution lies in the range from about 5° to about 10° C.

4. A process according to claim 1, wherein the reaction mixture is cooled during the second alkalization treatment, to maintain the temperature at not more than 18° C.

5. A process according to claim 1, wherein the alkali metal hydroxide is sodium hydroxide.

6. A process according to claim 1, wherein the disintegrated alkali cellulose is sulfided with carbon disulfide.

7. A process according to claim 6, wherein the sulfiding is effected by treating the alkali cellulose with from 22 to 28 weight percent carbon disulfide, with reference to the weight of the cellulose.

8. A process according to claim 1, wherein the second alkalization treatment of step (b2) is carried out after draining part of the excess alkali metal hydroxide solution from the reaction vessel in which step (a) is effected.

9. A process according to claim 1 wherein the alkali metal hydroxide solution in step (b2) in the second alkalization treatment is obtained by diluting the alkali metal hydroxide solution used in step (a) with 0° C. ice water to produce a solution having the desired concentration.

* * * * *